United States Patent Office 3,759,790
Patented Sept. 18, 1973

3,759,790
PROCESS FOR PREPARING L-PHENYLALANINE
Kiyoshi Nakayama, Sagamihara, and Hiroshi Hagino, Tokyo, Japan, assignors to Kyowa Hakko Kogyo Kabushiki Kaisha, Tokyo-to, Japan
No Drawing. Filed July 16, 1971, Ser. No. 163,486
Claims priority, application Japan, July 29, 1970, 45/65,755
Int. Cl. C12d 13/06
U.S. Cl. 195—29                                   7 Claims

ABSTRACT OF THE DISCLOSURE

L-phenylalanine is produced in substantial yield by fermentation from an L-phenylalanine-producing strain of coryneform glutamic acid-producing bacteria represented by *Corynebacterium glutamicum*. Specifically mutated strains of the above noted bacteria that exhibit resistance to at least one compound selected from the group consisting of tyrosine, phenylalanine and analogues thereof and exhibit a tyrosine requirement, produce large amounts of L-phenylalanine when cultured in a suitable nutrient medium.

DETAILED DESCRIPTION OF THE INVENTION

The present invention relates to a process for preparing L-phenylalanine, whereby an L-phenylalanine producing strain of coryneform glutamic acid-producing bacteria represented by *Corynebacterium glutamicum* is cultured in a nutrient medium to produce and accumulate L-phenylalanine in the fermented broth, from which L-phenylalanine is isolated for recovering. The present invention involves the use of strains of coryneform glutamic acid-producing bacteria represented by *Corynebacterium glutamicum* having high ability of producing L-phenylalanine and is directed to the production of L-phenylalanine which is important as an essential amino acid, on an industrial scale. Such glutamic acid-producing bacteria may be classified into either Micrococcus, Corynebacterium, Brevibacterium, Arthrobacter or Microbacterium. Coryneform glutamic acid-producing bacteria form a taxonomically closely related group of bacteria disclosed in J. General and Applied Microbiology, Abe et al., vol. 13, pp. 279–301 (1967).

Among known processes for preparing L-phenylalanine by fermentation is included a process using a microorganism which requires tyrosine for growth (Japanese patent publication No. 6,345/62). But this process can hardly be applicable to the production of L-phenylalanine on a large scale and with cheaper costs because of its low production yield.

We have discovered that strains of coryneform glutamic acid-producing bacteria represented by *Corynebacterium glutamicum* which exhibit resistance to at least one compound selected from the group consisting of tyrosine phenylalanine, and analogues thereof (such as e.g. 2-fluorophenylalanine, 3 - fluorophenylalanine, 4 - fluorophenylalanine, 2-methylphenylalanine, 3-methylphenylalanine, 4-methylphenylalanine, 2-hydroxyphenylalanine, 3-hydroxyphenylalanine, 2-aminophenylalanine, 3-aminophenylalanine, 4 - aminophenylalanine, 2 - nitrophenylalanine, 4-nitrophenylalanine, β-2-thienylalanine, β-3-thienylalanine, 2-indole alanine, 1-naphthyl alanine, 2-naphthyl alanine, 2-pyridyl alanine, 2-thiazole alanine, 3-thiazole alanine, 3-aminotyrosine, 3-fluorotyrosine, 3-hydroxytyrosine, 3-nitrotyrosine, 5-hydroxy-2-pyridyl alanine, phenylalanine, hydroxamate, etc.) and further which have the requirement (including so-called "leaky" type in which the requirement is not absolute) for tyrosine are capable of producing and accumulating a large amount of L-phenylalanine. In this case, it is also found that the difference between the function of the analogues of tyrosine and those of phenylalanine is not clear so that, for example, 4-fluorophenylalanine acts as an analogue of both tyrosine and phenylalanine.

Mutant strains of coryneform glutamic acid-producing bacteria represented by *Corynebacterium glutamicum* having the above-mentioned properties may be used for the purpose of the process of the present invention.

Microorganisms capable of producing L-glutamic acid according to the present invention are members of *Brevibacterium flavium, Brevibacterium glutamigenum, Brevibacterium divaricatum, Brevibacterium lactofermentum, Brevibacterium roseum, Brevibacterium immariophilium, Brevibacterium thiogenitalis, Brevibacterium saccharolyiticum, Brevibacterium ammoniagenes, Corynebacterium callunae, Corynebacterium acetoacidophilum, Corynebacterium melassecola, Corynebacterium herculis, Microbacterium ammoniaphilum, Microbacterium flavum var. glutamicum, Arthrobacter globiformis,* and *Arthrobacter citreus.* Preferable species for use in the process of this invention are shown in the undergonig examples. As shown in the examples, these strains can produce considerably larger amounts of L-phenylalanine than that obtained by the process disclosed in Japanese patent publication No. 6,345/62. Thus, it is possible according to the present invention to provide an excellent process for industrial production of L-phenylalanine.

The strains which may be used for the process of the present invention and whose properties are described above, can be obtained by subjecting certain strains belonging to the said bacteria to mutation treatments such as e.g. irradiation by ultraviolet light, X-ray, cobalt 60, etc. and chemical treatment, etc. and then screening the strains for isolation from colonies capable of growing on agar plate media containing tyrosine, phenylalanine, or analogues thereof. For example, L-phenylalanine producing strains which are resistant to 4-fluorophenylalanine are selected and isolated from colonies grown on a plate containing 100–10,000 μg./ml. of 4-fluorophenylalanine. Among these strains are included some strains capable of growing in 4-fluorophenylalanine containing media at higher concentration.

When a parent strain is subjected to a series of mutation treatment, it is possible to obtain the mutant strain having resistance to two or more of the said compounds.

Any of synthetic or natural media may be used for the purpose of the present invention if they contain suitable amounts of nitrogen sources, carbon sources, inorganic materials as well as trace amounts of nutrients required for growth of the used strain, as shown in the examples.

Preferable carbon sources are exemplified by various carbohydrates such as glucose, glycerol, fructose, sucrose, maltose, mannose, starch, starch hydrolyzate, molasses, etc. It is also possible to use as carbon sources various organic acids such as pyruvic acid, lactic acid, acetic acid, fumaric acid, etc.

Preferable nitrogen sources include, for example, ammonia, various inorganic and organic ammonium salts such as ammonium chloride, ammonium sulfate, ammonium carbonate, ammonium acetate, urea and other nitrogen-containing materials as well as various other nitrogeneous organic materials such as peptone, NZ-amine, meat extract, yeast extract, corn steep liquor, casein hydrolyzate, fish meal or its digested material, defatted soybean or its digested material, chrysalis hydrolyzate, etc.

It is also possible to use as inorganic materials potassium monohydrogen phosphate, potassium dihydrogen phosphate, magnesium sulfate, sodium chloride, ferrous sulfate, manganese sulfate, calcium carbonate, etc. In case the utilized strain requires traceable amounts of nutritional elements such as vitamins, amino acids, etc., these nutrients are added to the medium. But it is not necessary to add them intentionally to the medium when they are sufficiently contained in other ingredients of the medium.

The strain is cultured under aerobic conditions, for example, by culturing with shaking, aeration-agitation etc. The preferable culture temperature is, in general, from 20–40° C. The pH of the medium is preferably maintained at from 4 to 8 during the cultivation. However, other temperature and pH conditions may also be used, if desired. The time for culture is usually from 2 days to 5 days to accumulate a substantial amount of L-phenylalanine in the medium.

After the completion of the cultivation, microbial cells are first removed from the fermented broth, and then L-phenylalanine is recovered therefrom in a suitable manner such as by using activated carbon treatment, ion exchange resin treatment, etc., as shown in the examples.

The following nonlimiting examples illustrate the invention.

Example 1

L-phenylalanine-producing strains belonging to *Corynebacterium glutamicum* and having the properties shown in Table 1 were used. Among these strains, those showing resistance to two or more analogues had been obtained by a series of mutation treatments. These strains were respectively cultured for 24 hours in each seed medium containing glucose (2%), peptone (1%), yeast extract (1%), and NaCl (0.3%). The resultant seeds (each 1 ml.) were respectively inoculated each into 10 ml. of fermentation medium in a large test tube and cultured at 30° C. for 4 days with shaking. The amounts of L-phenylalanine obtained from their respective cultured broths are shown in Table 1.

The composition of the fermentation medium was cane molasses (10% as glucose), $K_2HPO_4$ (0.05%), $KH_2PO_4$ (0.05%), $MgSO_4 \cdot 7H_2O$ (0.025%), ammonium sulfate (2%), corn steep liquor (0.5%) and $CaCO_3$ (2%) (pH: 7.2).

After the completion of the fermentation, 1 liter of the cultured broth was centrifuged to remove microbial cells and $CaCO_3$. The resultant liquor was mixed with active charcoal which had previously been treated with acetic acid and was thoroughly mixed to adsorb phenylalanine thereon. The charcoal was separated by filtration and was washed with water. The charcoal was eluted with 20% (v./v.) acetic acid containing phenol (5% v./v.) and the eluate was treated with ether. After the removal of phenol, the eluate was concentrated and was passed through a column of a strongly acidic cation exchange resin (Diaion SK–1A) ($H^+$ form) to adsorb phenylalanine which was then eluted with 0.3% aqueous ammonia. The phenylalanine fraction of the eluate was concentrated and precipitated with alcohol to recover L-phenylalanine.

TABLE I

| Strain: | Amount of L-phenylalanine produced (mg./ml.) |
|---|---|
| Tyr⁻, PFP$^R$ (ATCC 21668) | 6.9 |
| Tyr⁻, TA$^R$ (ATCC 21669) | 6.4 |
| Tyr⁻, PFP$^R$, 3AT$^R$ (ATCC 21670) | 10.6 |
| Tyr⁻, TA$^R$, 3AT$^R$ (ATCC 21671) | 10.2 |
| Tyr⁻, PFP$^R$, TA$^R$ 3AT$^R$ (ATCC 21672) | 12.6 |
| Tyr⁻, PFP$^R$, PAP$^R$, 3AT$^R$ (ATCC 21673) | 13.2 |
| Tyr⁻, PFP$^R$, PAP$^R$, TA$^R$, 3AT$^R$ (ATCC 21574) | 13.8 |

Note:
Tyr⁻—tyrosine-requiring
PFP$^R$—resistant to 4-fluorophenylalanine
TA$^R$—resistant to β-2-thienylalanine
3AT$^R$—resistant to 3-aminotyrosine
PAP$^R$—resistant to 4-aminophenylalanine
ATCC—American Type Culture Collection.

Example 2

An L-phenylalanine-producing strain (ATCC 21673) belonging to *Corynebacterium glutamicum* and having tyrosine requirements as well as being resistant to 4-fluorophenylalanine, 4-aminophenylalanine and 3-aminotyrosine was used as seed. This strain was cultured for 24 hours in a seed medium having a composition of cane molasses (7% as glucose), corn steep liquor (0.3%), $K_2HPO_4$ (0.1%), $KH_2PO_4$ (0.1%), $MgSO_4 \cdot 7H_2O$ (0.05%), and soybean meal hydrolyzate solution (0.9% as soybean meal) (soybean meal decomposed by 6 N $H_2SO_4$ and neutralized with aqueous ammonia). The resultant seed culture (300 ml.) was inoculated into a fermentation medium (3 liters) in a 5-liter jar fermenter and cultured at 30° C. for 72 hours with aeration (3 liter/min.) and agitation (600 r.p.m.) to produce 16.8 mg./ml. of L-phenylalanine.

The composition of the fermentation medium was cane molasses (15% as glucose), corn steep liquor (0.1%), $KH_2PO_4$ (0.1%), $K_2HPO_4$ (0.1%), $MgSO_4 \cdot 7H_2O$ (0.05%), and soybean decomposed solution, 0.9% as soybean meal) (pH: 7.2).

Example 3

L-phenylalanine-producing strains obtained by mutation treatments from *Brevibacterium divaricatum*, *Brevibacterium flavum*, *Brevibacterium saccharolyticum*, *Brevibacterium roseum*, *Brevibacterium lactofermentum*, *Brevibacterium immariophilium*, *Arthrobacter citreus*, *Arthrobacter globiformis*, *Microbacterium ammoniaphilum* and *Microbacterium flavum* var. *glutamicum* and having the properties shown in Table II were used as seeds. These strains were respectively cultured in a similar manner to that described in Example 1 to produce L-phenylalanine shown in Table II below.

TABLE II

| Strain: | Amount of L-phenylalanine produced (mg./ml.) |
|---|---|
| *Brevibacterium divaricatum* Tyr⁻, PFP$^R$ | 8.9 |
| *Brevibacterium flavum* Tyr⁻, PFP$^R$ | 7.8 |
| *Brevibacterium saccharolyticum* Tyr⁻, PFP$^R$ | 6.9 |
| *Brevibacterium roseum* Tyr⁻, PFP$^R$ | 7.6 |
| *Brevibacterium lactofermentum* Tyr⁻, PFP$^R$ | 7.6 |
| *Brevibacterium immariophilium* Tyr⁻, PFP$^R$ | 7.9 |
| *Arthrobacter citreus* Tyr⁻, PFP$^R$ | 9.3 |
| *Arthrobacter globiformis* Tyr⁻, PFP$^R$ | 8.6 |
| *Microbacterium ammoniaphilum* Tyr⁻, PFP$^R$ | 8.8 |
| *Microbacterium flavum* var. *glutamicum* Tyr⁻, PFP$^R$ | 7.2 |

What is claimed is:

1. A process for producing L-phenylalanine by fermentation which comprises culturing in a nutrient medium an L-phenylalanine-producing mutant strain of coryneform glutamic acid-producing bacteria belonging to the genus selected from the group consisting of Corynebacterium Brevibacterium, Microbacterium and Arthrobacter having the property of resistance to at least one compound selected from the group consisting of tyrosine analogues and phenylalanine analogues and further having the property of requiring tyrosine to produce and accumulate L-phenylalanine in the culture liquor, and thereafter recovering the L-phenylalanine from the culture liquor.

2. The process of claim 1 in which the L-phenylalanine-producing mutant strain is *Corynebacterium glutamicum* selected from the strains consisting of American Type Culture Collection 21669, American Type Culture Collection 21670, Amreican Type Culture Collection 21671, American Type Culture Collection 21672, American Type Culture Collection 21673, and American Type Culture Collection 21674.

3. The process of claim 1 in which the L-phenylalanine producing mutant strain is selected from the group consisting of *Brevibacterium flavum, Brevibacterium glutamigenum, Brevibacterium divaricatum, Brevibacterium lactofermentum, Brevibacterium roseum, Brevibacterium immariophilium, Brevibacterium thiogenitalis, Brevibacterium saccharolyticum, Brevibacterium ammoniagenes, Corynebacterium callunae, Corynebacterium acetoacidophilum, Corynebacterium melassecola, Corynebacterium herculis, Microbacterium ammoniaphilum, Microbacterium flavum* var. *glutamicum, Arthrobacter globiformis* and *Arthrobacter citreus*.

4. The process of claim 1 in which the nutrient medium includes a nitrogen source, a carbon source and inorganic nutrient materials.

5. The process of claim 1 in which the culturing is carried out aerobically at a temperature of from about 20° C. to about 40° C. at a pH of from 4 to 8 for 2 to 5 days.

6. A process for preparing L-phenylalanine by fermentation which comprises culturing a strain selected from the group consisting of *Corynebacterium glutamicum* American Type Culture Collection 21669, American Type Culture Collection 21670, American Type Culture Collection 21671, American Type Culture Collection 21672, American Type Culture Collection 21673, American Type Culture Collection 21674, and American Type Culture Collection 21675, in a nutrient medium comprising a nitrogen source, a carbon source and inorganic nutrient materials under aerobic conditions at a temperature of from about 20° C. to about 40° C. at a pH of from 4 to 8 for two of five days to produce and accumulate L-phenylalanine in the culture liquor and recovering the accumulated L-phenylalanine therefrom.

7. A process for preparing L-phenylalanine by fermentation which comprises culturing an L-phenylalanine-producing mutant strain of glutamic acid-producing bacteria of *Corynebacterium glutamicum* being resistant to at least one compound selected from the group consisting of tyrosine analogues and phenylalanine analogues and further having a tyrosine requirement, in a nutrient medium comprising a nitrogen source, a carbon source and inorganic nutrient materials under aerobic conditions to produce and accumulate L-phenylalanine in the culture liquor and recovering the accumulated L-phenylalanine therefrom.

References Cited

UNITED STATES PATENTS 3,660,235   5/1972   Okumura et al.   _ _ _ _ _ _   195—29

ALVIN E. TANENHOLTZ, Primary Examiner

U.S. Cl. X.R.

195—47

UNITED STATES PATENT OFFICE
CERTIFICATE OF CORRECTION

Patent No. 3,759,790         Dated September 18, 1973

Inventor(s) Kiyoshi Nakayama, et al

It is certified that error appears in the above-identified patent and that said Letters Patent are hereby corrected as shown below:

IN THE SPECIFICATION:

Column 2, line 44, "treatment" should be --treatments--.

Column 3, line 70, "(ATCC 21574)" should be --(ATCC 21674)--.

IN THE CLAIMS:

Claim 2, line 5, "Amreican" should be --American--.

Claim 6, line 13, "of" should be --to--.

Signed and sealed this 30th day of July 1974.

(SEAL)
Attest:

McCOY M. GIBSON, JR.            C. MARSHALL DANN
Attesting Officer               Commissioner of Patents